UNITED STATES PATENT OFFICE.

HARRY CRAIGHILL BADDER, OF BEDFORD PARK, LONDON, ENGLAND, ASSIGNOR TO SPENCER FREEMAN BURROWS AND HENRY LEWIS PHIPPS ALLENDER, OF LONDON, ENGLAND.

COMPOSITION FOR AND THE PRODUCTION OF WATERPROOF CEMENTS, CONCRETES, AND MORTARS.

1,396,546.  Specification of Letters Patent.  Patented Nov. 8, 1921.

No Drawing.   Application filed July 9, 1919.  Serial No. 309,730.

*To all whom it may concern:*

Be it known that I, HARRY CRAIGHILL BADDER, a subject of the King of England, and residing at Bedford Park, London, in the county of Middlesex, England, have invented new and useful Improvements in and Connected with Compositions for and the Production of Waterproof Cements, Concretes, and Mortars, of which the following is a specification.

This invention has reference to the production of cement concrete or cement mortar—and lime concrete or mortar—which are waterproof or non-absorptive to moisture.

According to this invention, a waterproof or moisture non-absorptive cement concrete comprises a cement of known kind, preferably Portland cement, an aggregate, and an aluminum silicate compound of the character hereinafter specified.

I have found that the proportions of the aluminum silicate compound, which will produce the quality of concrete referred to, are about from 95% to 75% of cement used in the concrete, and 5% to 25% of the aluminum silicate compound.

Further according to this invention, an aluminum silicate compound which is highly efficient and advantageous, consists of a mixture of (1) basic aluminum silicate, and silicate of potassium or equivalent basic substance, and (2) an aluminum silicate and chlorid of zinc, magnesium, calcium or other equivalent metal.

These substances or compounds are preferably prepared in a special manner as follows:

The basic aluminum silicate which is to be combined with silicate of potassium or like metal or substance, may consist of a dried china or equivalent clay broken up, and saturated in a solution of silicate of potassium, or silicate of sodium, or like substance, say for a few hours; the compound is then dried, and subsequently reduced to a fine state of division or powder. The aluminum body which is used in the compound consisting of the basic aluminum silicate and chlorid of calcium or the like, consists of clay—containing say about 33% alumina or more—burnt to a burnt brick condition, and this is broken up into cubes say about half inch cubes, and these are saturated with the solution of chlorid of calcium or equivalent chlorid, and subsequently dried by heat, and then reduced to a fine state of division or powder.

I have found that if unburnt clay be used in this latter preparation it curdles, and is unsuitable and does not act in the manner required.

The two powders or reduced bodies of material are mixed together preferably, in a mixing machine; and there is added to them at the time of mixing a small proportion of sulfate of a metal or earth, say to the extent of 2½% to 10% also in a finely divided state; and this mixture is added to the cement used in making the concrete of Portland cement, aggregate and water.

In concrete comprising as one of its ingredients the mixture above referred to, the voids in it are filled up so as to render it waterproof or proof against the entry or passage of water or moisture; and in addition, in making and mixing the concrete a chemical reaction is set up with the result that the free or loosely combined lime in the cement is acted upon by the free silicates and chlorids in the mixture which makes the resulting concrete much harder and stronger, when set.

With regard to the aluminum silicate powders used, these may be employed in equal proportions; but in some cases the powder produced from the combination of clay and silicate of potassium or the like may be in greater quantity than the other.

With regard to the sulfate used, this may advantageously consist of magnesium or calcium sulfate, or preferably a mixture of both. Its effect is that the starting of the chemical reaction above referred to in connection with the free lime is promoted.

If the mixture above referred to be employed in connection with lime concrete or mortars, it renders same slightly hydraulic, and waterproof and non-absorptive of moisture.

By the use of burnt clay, holding in it a dried chlorid of calcium or the like, and of dried clay holding in it a dried silicate of potassium or the like, chemical reaction between these ingredients is prevented, and reaction is reserved until the cement mixed with the said powders is combined by the water used in the manufacture of concrete, which is what is required.

Instead of using chlorid of calcium, chlorid of zinc, or other metal may be employed.

In some cases, for special purposes, in lieu of using an aluminum silicate, a silicate of another metal or of a like character or group of metals may be employed—pumice for instance; but the basic aluminum silicate consisting of clay is simplest and cheapest, and best material for general purposes that can be employed in the manufacture or production of this powder or powder compound for use in cement or lime concrete.

Further, in some cases, where it is not required that the compound, used with the cement in making concretes and mortars should impart increased strength to it, but only that it should render the concrete waterproof or non-absorptive to moisture, the vehicle or carrier of the liquid silicates and chlorids specified may consist of pulverulent material known to be inert when mixed or combined in the cement.

It is known that in making cement concretes, solutions of silicates or chlorids have been made use of by adding them to the water in making the concrete and it is also known that a solution of liquid silicate has been used by spraying it over the concrete as soon as it has set and hardened sufficiently for this to be done mostly with a view of making the concrete set more quickly, or to make it harder, but it is unsuccessful because the free or loosely combined lime is scattered or deposited all through the concrete and cannot be reached by a solution applied to the surface of the concrete.

What is claimed is:—

1. A mixture for waterproofing concrete comprising a basic aluminum silicate, and a soluble silicate of a metal, and an aluminum silicate and an alkaline earth metal chlorid.

2. A mixture for waterproofing cement, comprising clay mixed with sodium silicate and dried, and burnt clay saturated with calcium chlorid and dried.

3. A mixture for waterproofing cement, comprising a dried aluminum silicate saturated with a solution of sodium silicate, and a dried aluminum silicate saturated with a solution of calcium chlorid.

4. A mixture for making cement waterproof and moisture non-absorptive, comprising clay saturated with sodium silicate and dried, mixed with burnt clay saturated with an alkaline earth metal chlorid and dried.

5. A mixture for waterproofing and hardening cement, comprising clay saturated with sodium silicate and dried, burnt clay saturated with calcium chlorid and dried, and a sulfate.

6. A waterproof moisture non-absorptive cement, comprising a mixture of aluminum silicate, saturated with a solution of sodium silicate and dried, an aluminum silicate saturated with a solution of an alkaline earth metal chlorid and dried, and a sulfate, aggregate, and water.

7. A mixture for waterproofing cement comprising aluminum silicate saturated with a solution of a silicate of a metal and dried, and aluminum silicate saturated with a solution of an alkaline earth metal chlorid and dried.

In testimony whereof I have signed my name to this specification in the presence of two subscribing witnesses.

HARRY CRAIGHILL BADDER.

Witnesses:
WILLIAM W. STOCK,
EDWARD STARR.